United States Patent [19]

Haba et al.

[11] Patent Number: 4,913,543

[45] Date of Patent: Apr. 3, 1990

[54] MIRROR ANGLE ADJUSTING DEVICE FOR DOOR MIRROR ASSEMBLY

[75] Inventors: Shinji Haba; Hitoshi Kanazawa, both of Aichi, Japan

[73] Assignee: Kabushiki Kaisha Tokai Rika Denki Seisakusho, Aichi, Japan

[21] Appl. No.: 266,571

[22] Filed: Nov. 3, 1988

[30] Foreign Application Priority Data

Nov. 9, 1987 [JP] Japan .............................. 62-170917[U]
Apr. 13, 1988 [JP] Japan .............................. 63-50196[U]

[51] Int. Cl.$^4$ .......................... G02B 7/18; B60R 1/06; A47G 1/24
[52] U.S. Cl. .................................... 350/635; 248/480; 248/484; 248/487
[58] Field of Search ...................... 350/635, 632, 606; 248/480–484, 485–487

[56] References Cited

U.S. PATENT DOCUMENTS

4,548,483 10/1985 Moro et al. .......................... 350/635
4,660,944 4/1987 Suzuki et al. ....................... 350/635
4,783,161 11/1988 Shamoto .............................. 350/635

Primary Examiner—Jon W. Henry

[57] ABSTRACT

A mirror angle adjusting device for a door mirror assembly for use in motor vehicles has an operating lever, and first and second connecting members for sequentially transmitting to a mirror holder vertical and horizontal movements of the lever for angle adjustment. Smooth operation of the angle adjustment of a mirror can be performed by a connection between the lever and the first connecting member, and between the first connecting member and the second connecting member. The first connecting member can include a first joint for connecting with the lever, and a second joint for connecting the first joint with the second connecting member.

2 Claims, 7 Drawing Sheets

MIRROR ANGLE ADJUSTING DEVICE FOR DOOR MIRROR ASSEMBLY

BACKGROUND OF THE INVENTION

The present invention generally relates to a mirror angle adjusting device for a door mirror assembly for use, for example, in a motor vehicle wherein a mirror holder is rotatable around vertical and horizontal axes by pivotal operation of a manual operating lever for angular adjustment of a mirror supported in the mirror holder.

Figure 10:
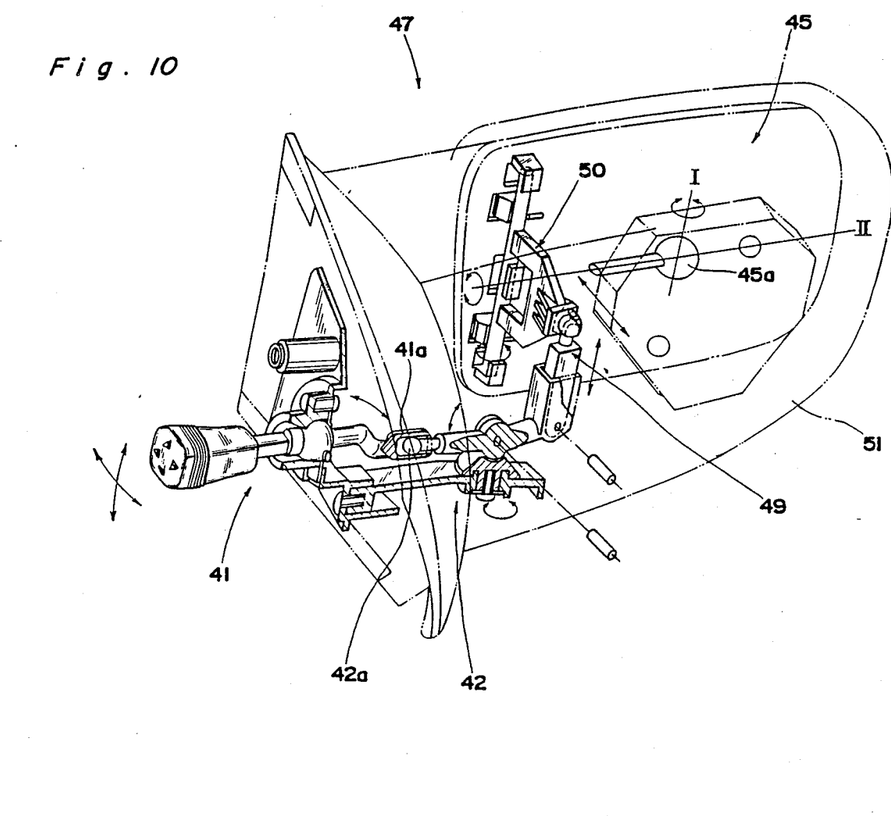
FIG. 10 is a perspective view of one type of a proposed mirror angle adjusting device for a door mirror assembly with portions broken away for clarity.

In this art, there have been proposed various mirror angle adjusting devices which are of the type that angular adjustment of a mirror in a door mirror assembly is performed by pivotal operation of a manual lever thereof. For example, Japanese Utility Model Publication No. 63-45336 disclosed such a device shown in FIG. 10. The construction of the device is as follows: The device includes a mirrior holder 45 for supporting a mirror (not shown) and a manual lever 41 for pivotally operating the mirrior holder 45. The mirror holder 45 is supported by a mirror case 51 to be pivoted on the spherical joint 45a of the mirror holder 45 so as to perform an angle adjustment of the mirror. The manual lever 41 is pivotably supported by the mirror case 51. The spherical connecting portion 42a of a first connecting member 42 is inserted into the cylindrical connecting portion 41a of the distal end of the level 41 to be capable of moving in an axial direction thereof to connect therebetween. The first connecting member 42 is connected with the mirror holder 45 through a second connecting member 49 and a third connecting member 50. Therefore, when the lever 41 is pivoted in vertical and horizontal directions, the mirror holder 45 is rotated around the spherical portion 45a of the mirror holder 45 so as to perform an angle adjustment of the mirror. The device 47 in accordance with the above-described construction is of a type which is fixed to the door so as not to tilt against a door or the like.

In the contruction, however, it sometimes becomes impossible to operate the lever for angle adjustment of the mirror because the spherical connecting portion of the first connecting member comes off the cylindrical connecting portion of the lever during pivotal operation of the lever.

For providing a better device, the lever can conceivably include a longer cylindrical connecting portion extending in an axial direction thereof such that the spherical connecting portion of the first connecting member is hard to remove. However, in the conceived device, there is a defect that the lever has a lesser degree of freedom, namely, the pivotable range of the lever is smaller.

SUMMARY OF THE INVENTION

Accordingly, an essential object of the present invention is to provide a mirror angle adjusting device for a door mirror assembly wherein a lever can connect a connecting member with higher reliability during pivotal operation of the lever and a smooth and reliable angle adjustment by pivotal operation of the lever can be achieved.

In accomplishing this and other objects, there is provided a mirror angle adjusting device for a door mirror assembly comprising: a door mirror case; a mirror holder supporting a mirror, the mirror holder being rotatably supported by the door mirror case; a lever including an intermediate pivot fulcrum portion pivotally supported in the door mirror case, one end portion being formed as an operating portion which is manually pivotable in both vertical and horizontal directions thereof so as to rotate the mirror holder around an axis thereof, and an opposite end portion located in the door mirror case and an opposite end portion locatead in the door mirror case and formed as a connecting portion; a first connecting member including an intermediate pivot fulcrum portion pivotally supported by a support axis in the door mirror case so as to rotate in both vertical and horizontal directions thereof, one end portion being formed as a first connecting portion, and an opposite end portion being formed as a second connecting portion, the support axis of the fulcrum portion being supported by the door mirror case to move in a perpendicular direction intersecting an axial direction thereof; and a second connecting member including an axial portion arranged at a back surface of the mirror holder along a vertical axis of the mirror holder and rotatably supported around an axis thereof, a protruding portion projecting from the axial portion in a backward direction of the mirror holder, and a first connecting portion formed at a specified portion of the protruding portion of the second connecting member along a horizontal axis of the mirror holder; either one of the connecting portion of the lever and the first connecting portion of the first connecting member having a spherical portion, and the other of the connecting portion of the lever and the first connecting portion of the first connecting member having a clasping portion rotatably holding the spherical portion therein, so that the lever is connected with the first connecting member by both connecting portions to relatively bend in both vertical and horizontal directions thereof, not to move in an axial direction of one of the lever and the first connecting member, and not removable therefrom, either one of the second connecting portion of the first connecting member and the first connecting portion of the second connecting member having a spherical portion, and the other of the second connecting portion of the first connecting member and the first connecting portion of the second connecting member having a clasping portion rotatably holding the spherical portion therein to rotate around both the vertical and horizontal directions of the mirror holder, the lever being connected to the mirror holder through the first connecting member and the second connecting member, and the mirror holder being rotated around both the vertical and horizontal axes thereof by operation of the lever so as to adjust rotating angle of the mirror.

By the arrangement according to the present invention as described above, if the operating portion of the lever is pivoted downwardly, the connecting portion of the lever moves upwardly with the first connecting portion of the first connecting member, and the first connecting portion of the first connecting member is relatively rotated with respect to the connecting portion of the lever so as to absorb any deviation in rotation between the lever and the member. Then, based on the above operation, the first connecting member is rotated around the support axis of the fulcrum portion to move the second connecting portion downward with the first connecting portion of the second connecting member. Thus, the first connecting portion of the second connecting member is relatively rotated with respect to the second connecting portion of the first connecting member so as to rotate the mirror holder around the horizontal axis thereof while any deviation in rotation between both of the members is absorbed. At that time, if any horizontal deviation in rotation between the first connecting member and the lever with respect to the door mirror case arises between the member and the lever, the support axis moves in the perpendicular direction intersecting the axial direction of the support axis so as to absorb the deviation. If the operating portion of the lever is pivoted in one direction along the horizontal surface, the connecting portion of the level is integrally pivoted in the other direction with the first connecting portion of the first connecting member, and the first connecting portion of the first connecting member is relatively rotated with respect to the connecting portion of the lever so as to absorb any deviation in rotation between the lever and the member. Then, based on the above operation, the first connecting member is rotated around the fulcrum portion in the horizontal surface, and the first connecting portion of the second connecting member is relatively rotated with respect to the second connecting portion of the first connecting member. Thus, the axial portion of the second connecting member is rotated around the axis of the axial portion with respect to the mirror holder to rotate the mirror holder around the vertical axis while any deviation in rotation between both the members is absorbed. At that time, if any horizontal deviation in rotation between the first connecting member and the lever with respect to the door mirror case arises between the member and the lever, the fulcrum portion of the first connecting member moves in the axial direction of the support axis so as to absorb the deviation.

Therefore, since either one of the connecting portion of the lever and the first connecting portion of the first connecting member having a spherical portion, and the other of the connecting portion of the lever and the first connecting portion of the first connecting member having a clasping portion rotatably holding the spherical portion therein, so that the lever is connected with the first connecting member by both the connecting portions and does not come off the member, the degree of freedom of the lever, namely, pivotable region of the lever is not narrowly limited, and the reliabiltiy of the connection between the lever and the first connecting member is improved.

If any horizontal deviation in rotation between the first connecting member and the lever arises between the member and the lever, the fulcrum portion of the first connecting member moves with respect to the mirror case, and the deviation can be effectively absorbed. Thus, the smooth and reasonable rotation of the mirror holder around both the vertical and horizontal directions for angular adjustment of the mirror can be reliably performed to adjust the rotary angle of the mirror. Moreover, the number of the components in the device can decrease and the device can be simple in construction, as compared to the conventional device.

In another aspect of the present invention, the first connecting member comprises: a first joint including a first connecting portion of a first connecting member and formed at one end portion thereof, a second connecting portion formed at an opposite end portion thereof and an intermediate pivot fulcrum portion supported by the door mirror case through a support axis so as to rotate around both vertical and horizontal directions thereof, the support axis being supported by the door mirror case to move in a direction intersecting perpendicularly to an axial direction thereof; and a second joint including a second connecting portion formed at one end portion thereof, the first connecting portion of the first connecting member being formed at an opposite end portion thereof, and the intermediate pivot fulcrum portion of the first connecting member; either one of the connecting portion of the lever and the first connecting portion of the first joint having a spherical portion, and the other of the connecting portion of the lever and the first connecting portion of the first joint having a clasping portion rotatably holding the spherical portion therein, so that the lever is connected with the first joint by both the connecting portions to relatively bend in both the vertical and horizontal directions thereof, and to prevent movement in the axial direction of one of the lever and the first joint, and not be be removed therefrom, either one of the second connecting portion of the first joint and the first connecting portion of the second joint having a spherical portion, and the other of the second connecting portion of the first joint and the first connecting portion of the second joint having a clasping portion rotatably holding the spherical portion therein, so that the first joint is connected with the second joint by both of the connecting portions to relatively bend in both the vertical and horizontal directions thereof, to prevent movement in an axial direction of one of the first joint and the second joint, and to removal therefrom.

By another arrangement according to the present invention as described above, if the operating portion of the lever is pivoted downwardly, the connecting portion of the lever moves upwardly with the first connecting portion of the first joint, and the first connecting portion of the first joint is relatively rotated with respect to the connecting portion of the lever so as to absorb any deviation in rotation between the lever and the first joint. Then, based on the above operation, the first joint is rotated around the support axis of the fulcrum portion to move the second connecting portion of the first joint downward with the first connecting portion of the second joint. Thus, the first connecting portion of the second joint is relatively rotated with respect to the second connecting portion of the first joint so as to absorb any deviation in rotation between both joints. The second joint is rotated around the support axis of the fulcrum portion to move the second connecting portion of the second joint downward with the first connecting portion of the second connecting member. Then, the first connecting portion of the second connecting member is relatively rotated with respect to the second connecting portion of the second joint, and thus the mirror holder is rotated around the horizontal axis thereof while any deviation in rotation between the second joint and the second connecting member is absorbed. At that time, if any horizontal deviation in rotation among the first joint and the second joint and the lever with respect to the door mirror case arises among them, respectively, either the fulcrum portion of the first joint or the fulcrum portion of the second joint moves in the direction perpendicularly intersecting the axial direction of each support axis so as to absorb each deviation. If the operating portion of the lever is pivoted in one direction along the horizontal surface, the connecting portion of the lever is integrally pivoted in an opposite direction to the one direction with the first connecting portion of the first joint, and the first connecting portion of the first joint is relatively rotated with respect to the connecting portion of the lever so as to absorb any deviation in rotation between the lever and the joint. Then, based on the above operation, the first joint is rotated around the fulcrum portion in the horizontal plane, the second connecting portion of the first joint is integrally pivoted with the first connecting portion of the second joint, and the first connecting portion of the second joint is relatively rotated with respect to the second connecting portion of the first joint so as to absorb the deviation. Thus, the second joint is rotated around the fulcrum portion along the horizontal plane and the first connecting portion of the second connecting member is relatively rotated with respect to the second connecting portion of the first joint. Then, the axial portion of the second connecting member is rotated around the axis of the axial portion with respect to the mirror holder to rotate the mirror holder while any deviation in rotation between the second joint and the second connecting member is absorbed. At that time, if any horizontal deviation in rotation among the first joint and the second joint and the lever with respect to the door mirror case arises among them, respectively, either the fulcrum portion of the first joint or the fulcrum portion of the second joint moves in the direction perpendicularly intersecting the axial direction of each support axis so as to absorb each deviation.

Therefore, since either one of the connecting portion of the lever and the first connecting portion of the first joint having a spherical portion, and the other of the connecting portion of the lever and the first connecting portion of the first joint having a clasping portion rotatably held the spherical portion thereinto, so that the lever connected with the first joint by both the connecting portions does not come off the joint, the degree of freedom of the lever, namely, the pivotable region of the lever is not narrowly limited, and the reliability of connection between the lever and the first joint is improved. Furthermore, since the above construction is applied to the connection between the first joint and the second joint, the connection between both the joints has the same effects as described above.

If any horizontal deviations in rotation arise between the first connecting member and the lever and between the first joint and the second joint, the fulcrum portions of the first and second member move with respect to the mirror case and the deviations can be effectively absorbed. Thus, the smooth and reasonable rotation of the mirror holder around both the vertical and horizontal directions for angular adjustment of the mirror can be reliably performed to adjust the rotary angle of the mirror. Moreover, the number of the components in the device can decrease and the device can be simple in construction, as compared to the conventional device.

Moreover, according to the above arrangement, if the operating portion of the lever is pivoted upwardly, the mirror is rotated upwardly; if the operating portion of the lever is pivoted downwardly, the mirror is rotated downwardly; if the operating portion of the lever is pivoted in the backward direction of a motor vehicle, the mirror is rotated so as to confront the outer portion thereof to an operator; and if the operating portion of the lever is pivoted in the forward direction of the motor vehicle, the mirror is rotated so as to separate the outer portion thereof from the operator. Therefore, when the operator operates the lever, it becomes easy for the operator to operate the lever because the operating direction of the lever agrees with the rotary direction of the mirror as compared to the conventional type of device previously described.

In the above constructions of the devices, since the terms of "vertical" and "horizontal" are used for clarifying the description of the devices, the term of "vertical" can mean "horizontal" and the term of "horizontal" can mean "vertical". Namely, for example, the device can be so constructed that the vertical axis of the device is arranged along a horizontal axis of the motor vehicle and the horizontal axis of the device is arranged along a vertical axis of the motor vehicle.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals and symbols throughout the accompanying drawings.

Preferred embodiments of the present invention will now be described in detail with reference to FIGS. 1 to 9.

In one embodiment of the present invention, as shown in FIGS. 1, 2, 3 and 4, a mirror angle adjusting device for a door mirror assembly includes a mirror holder 5, which supports a mirror 4, supported by a door mirror case 11 pivotable on a spherical joint 5a of the mirror holder 5, and a lever 1, which causes the mirror holder 5 to pivot, supported by the miror case 11 pivotable thereon, the lever 1 being connected with the mirror holder 5 through a first connecting member 2 and a second connecting member 10, the mirror holder 5 being pivoted on the spherical joint 5a of the mirror holder 5 so as to perform an angle adjustment of the mirror 4 by pivotal operation of the lever 1 along vertical and horizontal axes thereof. The device in accordance with the above-described construction is fixed to a door so as not to tilt against the door or the like.

Figure 1:
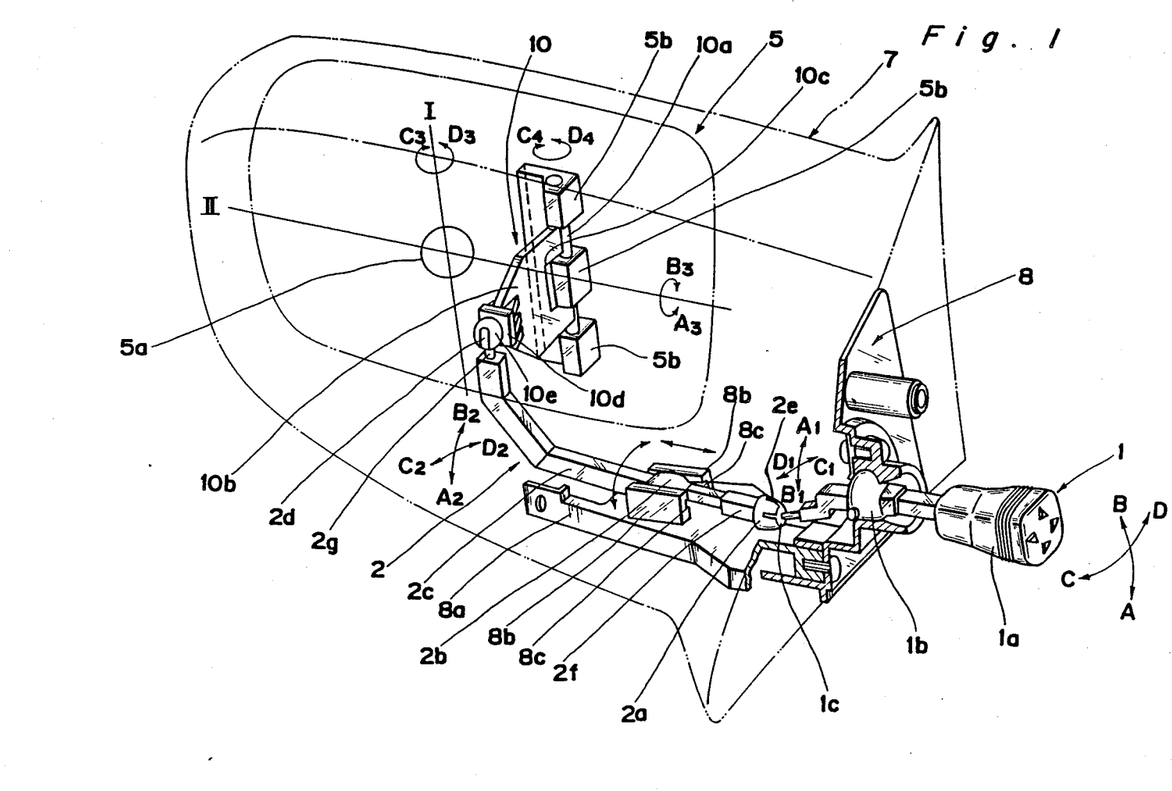
FIG. 1 is a diagrammatic perspective view of a mirror angle adjusting device for a door mirror assembly, with portions broken away for clarity, according to one preferred embodiment of the present invention.

The lever 1 is constructed in the form of a rod having a generally square section and has a spherical joint 1b formed integrally therewith at an axially middle portion thereof. The spherical joint 1b of the lever 1 is pivotally supported with a bracket 8 fixed to a door or the like. A lever operating knob 1a is fixed at one axial end portion of the lever 1. The other axial end portion of lever 1 is bent downwardly and a cylindrical connecting portion 1c is integrally formed at the distal end of the other axial end portion of the lever 1.

The first connecting member 2 is constructed in the bent form of a generally J-shaped member and has a spherical fulcrum 2b formed integrally therewith at an axially middle portion of an axial portion 2c thereof. The fulcrum 2b is supported with support axes 2h, 2h penetrating the fulcrum 2b relative to a pair of support walls 8b, 8b fixed to a projection portion 8a of the bracket 8. Grooves 8c, 8c extend on the surface of the supporting walls 8b, 8b in a direction perpendicularly intersecting an axial direction of the support axes formed at the inner surface of both the confronting supporting walls 8b, 8b, thus the axes 2h, 2h can move freely along the axial direction of the grooves 8c, 8c, namely, in the direction perpendicularly intersecting the axial direction of the support axes 2h, 2h. A clasping portion 2a acting as a connecting portion is formed at the one end portion of the first connecting member 2 through a thick neck portion 2f. Then, the spherical portion 1c of the lever 1 is pivotably engaged with the clasping portion 2a of the first connecting member 2. Namely, the spherical portion 1c of the lever 1 is held to rotate in relatively vertical and horizontal directions, to prevent movement in both the axial directions of the lever 1 so that the clasping portion 2a thereof does not come off. Slits 2e, 2e are formed at the clasping portion 2a of the first connecting member 2 so that the spherical portion 1c of the lever 1 can insert easily into the clasping portion 2a thereof. Any pivotal deviation, that is, any deviation in rotation between the lever 1 and the first connecting member 2 is absorbed by either of relatively bending and pivotal movement therebetween. The spherical portion 1c of the lever 1 is preferably made of metal or synthetic resin. The clasping portion 2a of the first connecting member 2 is preferably made of synthetic resin. The other end portion of the first connecting member 2 is formed so that the other end portion thereof is bent upwardly and the distal end of the other end portion thereof extends straight up to form a spherical portion 2d through a narrow neck portion 2g. Therefore, the first connecting member 2 can be pivoted on the fulcrum 2b as a pivotal center to the support walls 8b, 8b in the vertical and horizontal directions thereof and if a difference between the pivotal center of the lever 1 and that of the first connecting member 2 causes a horizontal deviation therebetween, each support axis 2h moves forward and backward along each groove 8c of the support wall 8b therein so as to absorb the deviation.

The second connecting member 10 includes an axial portion 10a connected with the back of the mirror holder 5, and a plate portion 10b projecting in a backward direction of the mirror holder 5 from the axial portion 10a. The axial portion 10a thereof is arranged on the motor vehicle body side to the spherical portion 5a of the mirror holder 5 in parallel with a vertical axis I and is supported with three clasping claws 5b, 5b and 5b so as to rotate and prohibit removal of the claws in the vertical and backward directions of the mirror holder 5. The plate portion 10b thereof is integrally formed at the axial portion 10a thereof along the vertical direction. The plate portion 10b has an opening 10c for receiving one of the claws 5b, and a clasping stand 10d arranged at a back end portion thereof along a direction perpendicularly intersecting to the surface of the plate portion 10b and the vertical direction. The clasping stand 10d thereof has a clasping portion 10e having a longitudinal inverse U-shaped section opening downwardly. Thus, the spherical portion 2d of the first connecting member 2 is securly held in the clasping portion 10e thereof so as not to come off and so that the clasping portion 10e can move integrally with the other end portion of the first connecting member 2 in the vertical and horizontal directions and can rotate around the spherical portion 2d thereof.

Figure 2:
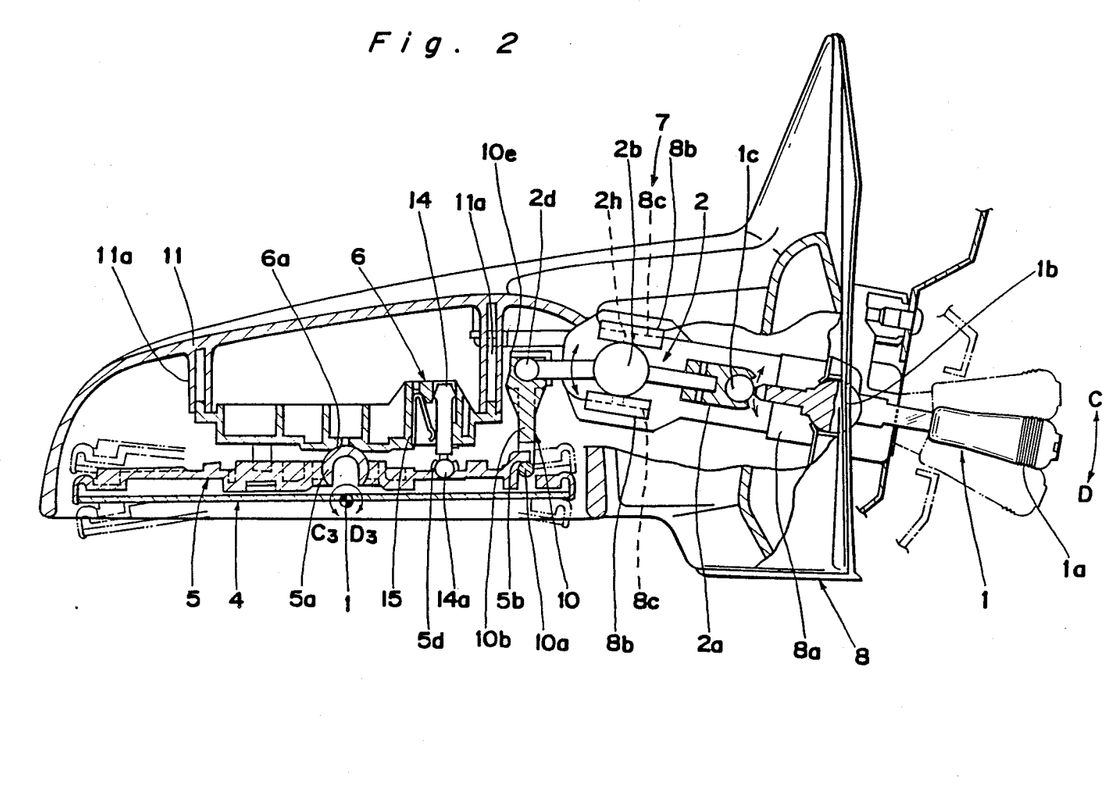
FIGS. 2, 3, and 4 are a plan view, a side view, and a front view of the mirror angle adjusting device with portions broken away for clarity, respectively.

Meanwhile, a mirror holder supporting member 6 is fixed to protruding portions 11a and 11a of the mirror case 11 in the door mirror case 11, as shown in FIG. 2. The mirror holder 5 is supported at the front side of the mirror holder supporting member 6 and the mirror 4 is fixed to the surface of the mirror holder 5. The mirror holder 5 has the spherical portion 5a integrally formed at the middle of the back surface thereof, as described above. The spherical portion 5a of the mirror holder 5 is engaged with a spherical portion receiver 6a of the mirror holder supporting member 6 so that the mirror holder 5 can rotate against the mirror holder supporting member 6 around the vertical axis I and the horizontal axis II. The mirror holder 5 has clasping portions 5d at specified portions in the vicinity of the spherical portion 5a of the back surface of the mirror holder 5 and on the vertical axis I and the horizontal axis II of the mirror holder 5, respectively. The mirror holder 5 also has guide rods 14 at specified portions confronting each clasping portion 5d of the mirror holder supporting member 6 so that each guide rod 14 can move toward the mirror holder 5. At the distal end portion of each guide rod 14, a spherical portion 14a is formed, thus each spherical portion 14a is held into each clasping portion 5d to prevent rotation of the mirror holder 5 around the spherical portion 5a of the mirror holder 5 along the surface of the mirror 4 and to guide rotation of the mirror holder 5 around the vertical axis I and the horizontal axis II thereof, respectively. In FIG. 2, reference numeral 15 denotes a leaf spring for pressing the side surface of each guide rod 14 on the mirror holder supporting member 6 so as to make a constant resistance act on each guide rod 14 when the guide rod 14 moves.

Hereinbelow, functioning of the device having the construction as described so far shall be explained.

If the knob 1a of the lever 1 is pivoted on the spherical portion 1b in a downward direction A as shown in FIG. 1, the spherical portion 1c of the other axial end connecting portion of the lever 1 is pivoted upwardly in FIG. 1 with the clasping portion 2a of the first connecting member 2, and the clasping portion 2a thereof is relatively rotated around the spherical portion 1c of the lever 1. Thus, the spherical portion 2a is pushed in an upward direction $A_1$ while any deviation in rotation between the lever 1 and the first connecting member 2 is absorbed. As a result, the spherical portion 2d of the first connecting member 2 is pushed in a downward direction $A_2$, and the clasping portion 10e of the second connecting member 10 is rotated around the spherical portion 2d of the first connecting member 2. Thus, the mirror 4 is rotated around the horizontal axis II in a direction $A_3$ while any deviation in rotation between the first connecting member 2 and the second connecting member 10 is absorbed.

Conversely, if the knob 1a of the lever 1 is pivoted on the spherical portion 1b thereof in an upward direction B, the spherical portion 1c of the lever 1 is pivoted downward in FIG. 1 with the clasping portion 2a of the first connecting member 2, and the clasping portion 2a is rotated around the spherical portion 1c of the lever 1. Thus, the clasping portion 2a of the first connecting member 2 is pushed in a downward direction $B_1$ while any deviation in rotation between the lever 1 and the first connecting member 2 is absorbed. As a result, the spherical portion 2d of the first connecting member 2 is pushed in an upward direction $B_2$, and the clasping portion 10e of the second connecting member 10 is rotated around the spherical portion 2d of the first connecting member 2. Thus, the mirror 4 is rotated around the horizontal axis II in a direction $B_3$ while any deviation in rotation between the first connecting member 2 and the second connecting member 10 is absorbed.

On the other hand, if the knob 1a of the lever 1 is pivoted on the spherical portion 1b of the lever 1 in a direction C, the spherical portion 1c of the distal end portion of the lever 1 is rotated around the spherical portion 1b, and the clasping portion 2a of the first connecting member 2 is relatively rotated around the spherical portion 1c. Thus, the clasping portion 2a is rotated around the fulcrum 2b arranged between the support walls 8b, 8b in the direction $C_1$ while any deviation in rotation between the lever 1 and the first connecting member 2 is absorbed. As a result, the spherical portion 2d of the other axial end portion of the first connecting member 2 is rotated around the fulcrum 2b in a direction $C_2$ to pull the second connecting member 10. Then, the mirror holder 5 is pulled in a backward direction $C_2$ of the mirror holder 5 to move the same. Subsequently, the clasping potion 10e of the second connecting member 10 is rotated around the spherical portion 2d of the first connecting member 2, and the axial portion 10a is rotated around the axis thereof in a direction $C_4$ with respect to the mirror holder 5. Thus, the miror holder 5 is rotated around the vertical axis I in a direction $C_3$ while any deviation in rotation between the first connecting member 2 and the second connecting member 10 is absorbed.

If the knob 1a of the lever 1 is pivoted around the spherical portion 1b in a direction D, the spherical portion 1c of the other axial end portion of the lever 1 is rotated around the spherical portion 1b, and the clasping portion 2d of the first connecting member 2 is relatively rotated around the spherical portion 1c. Thus, the clasping portion 2d is rotated around the fulcrum 2b in the direction $D_1$ while any deviation in rotation between the lever 1 and the first connecting member 2 is absorbed. As a result, the spherical portion 2d of the other end portion of the first connecting member 2 is rotated around the fulcrum 2b in a direction $D_1$ to push the second connecting member 10 so as to push the mirror holder 5 in a backward direction $D_2$ of the mirror holder 5. Thus, the clasping portion 10e of the second connecting member 10 is rotated around the spherical portion 2d of the first connecting member 2, and the axial portion 10a of the second connecting member 10 is rotated around the axis thereof in a direction $D_4$ in respect to the mirror holder 5. Thus, the mirror holder 5 is rotated around the vertical axis I in a direction $D_3$ while any deviation in rotation between the first connecting member 2 and the second connecting member 10 is absorbed.

In the above-described operation, if any horizontal deviation in rotation based on the difference between the rotary centers of the lever 1 and the first connecting member 2 arises therebetween, the fulcrum 2b of the first connecting member 2 moves along the direction perpendicularly intersecting to an axial direction of the support axis thereof between the support walls 8b, 8b so as to absorb the deviation.

According to the above first embodiment, since the spherical portion 1c of the other axial end portion of the lever 1 is inserted into the clasping portion 2a of the one end portion of the first connecting member 2 so as to not come off the clasping portion 2a, the reliability of connection between the lever 1 and the first connecting member 2 is improved. Furthermore, since the fulcrum 2b of the first connecting member 2 can freely move with respect to the support walls 8b, 8b of the bracket 8, the horizontal deviation in rotation between the first connecting member 2 and the lever 1 can be efficiently absorbed. Thus, the reasonable and smooth rotation of the mirror holder 5 around both the vertical axis I and the horizontal axis II thereof for angular adjustment of the mirror can be reliably performed. Meanwhile, the number of the components in the device can decrease and the device can be simple in construction, as compared to the previous described device.

The present invention is not limited to the embodiment described above. For example, the lever 1 can be provided with a clasping portion instead of the spherical portion 1c at the other axial end portion thereof, and the first connecting member 2 can be provided with a spherical portion instead of the clasping portion 2a at the one end portion thereof, so that the lever 1 is connected with the first connecting member 2 by inserting the spherical portion of the first connecting member 2 into the clasping portion of the lever 1. Furthermore, the first connecting member 2 can be provided with a clasping portion instead of the spherical portion 2d at the other end portion of the first connecting member 2, and the second connecting member 10 can be provided with a spherical portion instead of the clasping portion 10e.

Figure 5:
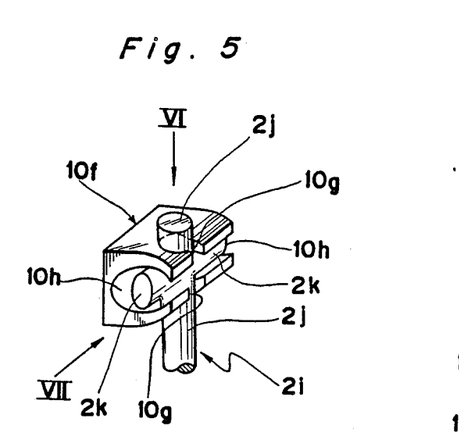
FIG. 5 is a perspective view showing the connecting construction between a first connecting member and a second connecting member according to another embodiment of the present invention.
Figure 6:
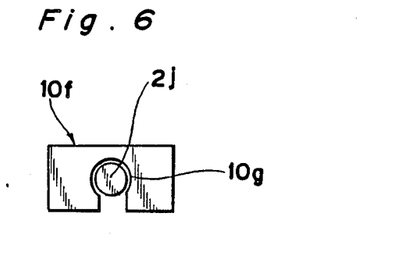
FIGS. 6 and 7 are views in the directions of the arrows VI and VII in FIG. 5, respectively.
Figure 7:
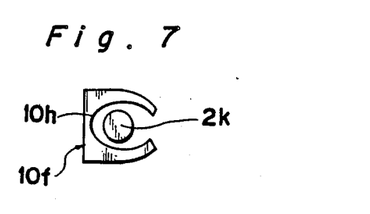

Meanwhile, as shown in FIGS. 5–7, the first connecting member 2 can be provided with a joint cross portion 2i instead of the spherical portion 2d, and the second connecting member 10 can be provided with a box-shaped connecting portion 10f instead of the clasping portion 10e. The connecting portion 10f has notch grooves 10g, 10g, 10h and 10h on four sides, respectively. The joint cross portion 2i is engaged to insert into the connecting portion 10f so that axial portions 2j, 2j of the joint cross portion 2i can rotate and can not move in the grooves 10g and 10g, so that axial portions 2k, 2k of the joint cross portion 2i can rotate and move in the grooves 10g, 10g. Thus, the first connecting member 2 can connect the second connecting member 10 so as to rotate around the vertical direction and to integrally move with the member 10 in the vertical and horizontal directions.

Figure 3:
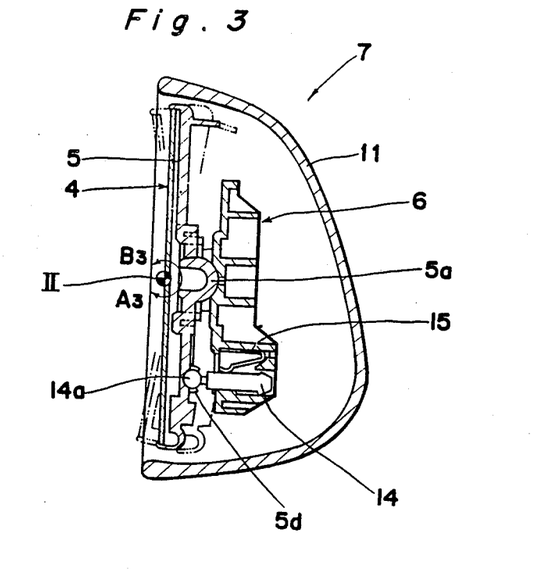
Figure 4:
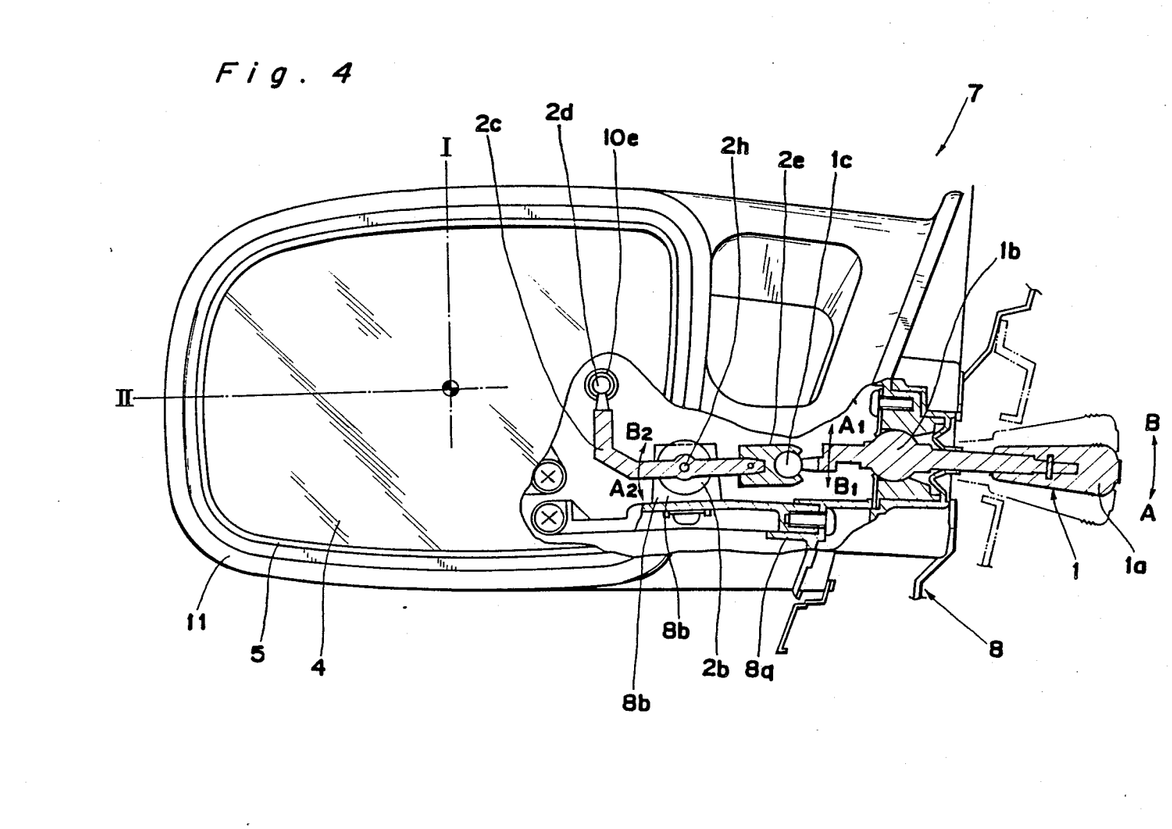
Figure 8:
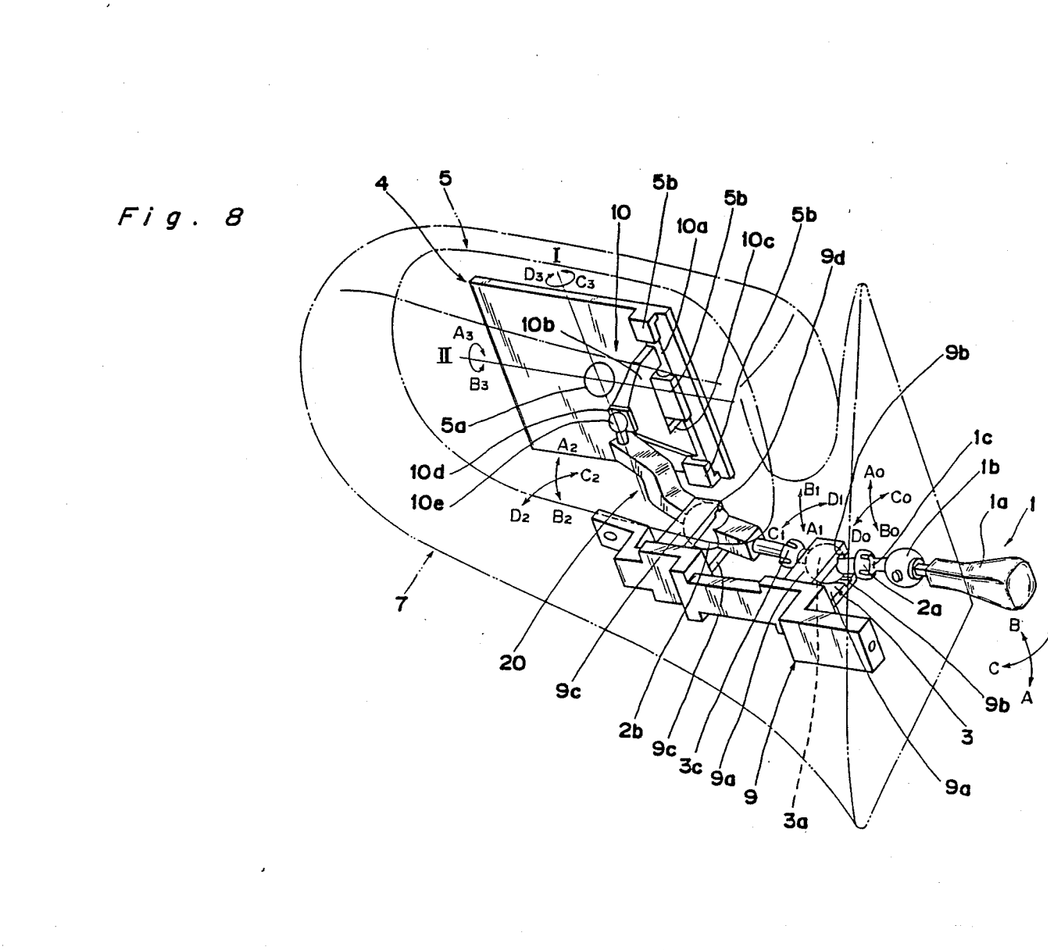
FIGS. 8 and 9 are a perspective view and a partial perspective view of a mirror angle adjusting device for a door mirror assembly according to another embodiment of the present invention, respectively.
Figure 9:
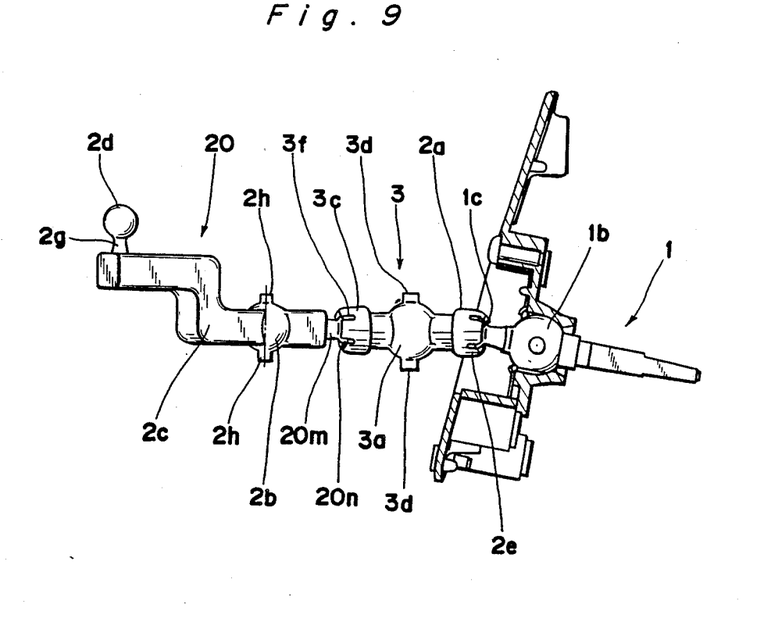

Furthermore, as shown in FIGS. 8 and 9, the first connecting member 2 can be composed of at least two members, namely, first joint 3 and second joint 20 so that the mirror is pivoted in an opposite direction to the pivoting direction of the lever 1 in the device shown in FIGS. 1, 2 and 3.

Namely, as shown in FIGS. 8 and 9, the first joint 20 has a spherical portion 20n, serving as a connecting portion, formed at the one end portion thereof through a narrow neck portion 20m. The fulcrum 2b of the first joint 20 is supported by the support axes 2h, 2h between an upper support wall 9c and a lower support wall 9c of a bracket 9 fixed to a door or the like of a motor vehicle. The support walls 9c, 9c each have a groove 9d extending along the surface of the confronting inner surface thereof and along a direction perpendicularly intersecting an axial direction of the support axes 2h, 2h at the inner surface thereof. Thus, the axes 2h, 2h can freely move in the grooves 9d, 9d along the direction intersecting perpendicularly to an axial direction thereof. The difference between the device of the first embodiment in FIGS. 1-3 and the device of this embodiment in FIGS. 8 and 9 is that the axes 2h, 2h can be arranged along the vertical direction and not along the direction horizontal to an axial direction of the first joint 20. On the other hand, the second joint 3 is composed of a member generally bending in the shape of a letter "V" and has a spherical fulcrum 3a integrally formed at the bending portion thereof. The fulcrum 3a is supported by support axes 3d, 3d which penetrate the fulcrum 3a, between an upper support wall 9a and a lower support wall 9a. Then, the support walls 9a, 9a each have a groove 9b extending along the surface of the inner confronting surface thereof and along a direction perpendicularly intersecting an axial direction of the support axes 3d, 3d at the inner surface thereof. Thus, the axis 3d can freely move in the grooves 9b, 9b along the direction perpendicularly intersecting the axial direction thereof. The second joint 3 has clasping portions 2a and 3c, serving as connecting portions, at both the end portions thereof, respectively. The spherical portion 1c of the lever 1 is connected with the clasping portion 2a of the second joint 3, as described previously. The spherical portion 20n of the first joint 20 is pivotably connected with the clasping portion 3c of the second joint 3. Namely, the spherical portion 20n is held in the clasping portion 3c so as to relatively rotate in the vertical and horizontal directions, without moving or coming off of the clasping portion 3c in the axial direction of the second joint 3 or the first joint 20. Both the clasping portions 2a and 3c have slits 2e, 2e, 3f and 3f, respectively, so as the easily receive the spherical portions 1c and 20n therein, respectively. Any deviation in rotation between the lever 1 and the second joint 3 can be absorbed by relative bend or rotation between the spherical portion 1c of the lever 1 and the clasping portion 2a of the second joint 3. Any deviation in rotation between the second joint 3 and the first joint 20 can be absorbed by relative bend and rotation between the spherical portion 20n of the first joint 20 and the clasping portion 3c of the second joint 3. Both of the clasping portions 2a and 3c are preferably made of synthetic resin.

According to the construction of the device, as shown in FIG. 8, if the knob 1a of the lever 1 is pivoted on the spherical portion 1b thereof in the downward direction A, the spherical portion 1c of the lever 1 is pivoted with the clasping portion 2a of the second joint 3 in an upward direction in FIG. 8, and the clasping portion 2a of the second joint 3 is relatively rotated around the spherical portion 1c of the lever 1. Thus, the clasping portion 2a of the second joint 3 is pushed in an upward direction $A_0$ while any deviation in rotation between the lever 1 and the second joint 3 is absorbed. As a result, the clasping portion 3c of the second joint 3 is relatively rotated around the spherical portion 20n of the first joint 20. Thus, the clasping portion 3c of the second joint 3 is pushed in a downward direction $A_1$ with the spherical portion 20n of the first joint 20 while any deviation in rotation between the first joint 20 and the second joint 3 is absorbed. Then, the spherical portion 2d of the first joint 20 is rotated upwardly around the fulcrum 2b of the first joint 20, and the clasping portion 10e of the second connecting member 10 is relatively rotated around the spherical portion 2d of the first joint 20. Thus, the clasping portion 10e of the second connecting member 10 is pushed in an upward direction $A_2$ while any deviation in rotation between the first joint 20 and the second connecting member 10 is absorbed. Subsequently, the mirror 4 is rotated around the horizontal axis II in a direction $A_3$. Conversely, if the lever 1 is pivoted in the direction B, the mirror 4 is rotated in an opposite direction $B_3$ to the above-described direction. Meanwhile, if the lever 1 is pivoted in the direction D, the spherical portion 1c of the lever 1 and the clasping portion 2a of the second joint 3 are moved in a direction $D_0$, and the clasping portion 3c of the second joint 3 and the spherical portion 20n of the first joint 20 are moved in a direction $D_1$. As a result, the spherical portion 2d of the first joint 20 and the clasping portion 10e of the second connecting member 10 are moved in a direction $D_2$, and the mirror 4 is rotated around the vertical axis I in a direction $D_3$. Furthermore, if the lever 1 is pivoted in the direction C, the mirror 4 is moved in an opposite direction $C_3$ to the above-described direction. The clasping portion of each element is relatively rotated around the spherical portion of an element connected with the element, and thus any deviation in rotation between both the elements is absorbed.

In the above-described operations, if any horizontal deviation in rotation based on the difference between the rotary centers of the lever 1 and the second joint 3 arises therebetween, the fulcrum 3a of the second joint 3 moves along the direction perpendicularly intersecting the axial direction of the support axis thereof between the support walls 9a, 9a so as to absorb the deviation. If any horizontal deviation in rotation based on the difference between the rotary centers of the second joint 3 and the first joint 20 arises therebetween, the fulcrum 2b of the first joint 20 moves along the direction perpendicularly intersecting the axial direction of the support axis thereof between the support walls 9c, 9c so as to absorb the deviation.

According to the embodiment shown in FIGS. 8 and 9, if the lever 1 is pivoted upwardly, the mirror 4 is rotated upwardly around the axis thereof. Conversely, if the lever 1 is pivoted downward, the mirror 4 is rotated downward around the axis thereof. If the lever 1 is pivoted toward an operator, namely, in the backward direction of a motor vehicle body, the mirror 4 is rotated so that the outer portion of the mirror 4 faces to the operator. If the lever 1 is pivoted in the forward direction of the motor vehicle body, the mirror 4 is rotated so that the outer portion of the mirror 4 separates from the operator. Therefore, when the operator operates the lever 1 for angular adjustment of the mirror, it becomes necessary for the operator to operate the lever because the operating direction of the lever 1 agrees with the rotary direction of the mirror 4 as compared to the first embodiment in FIGS. 1-3.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A mirror angle adjusting device for a door mirror assembly comprising:

a door mirror case;

a mirror holder supporting a mirror and rotatably supported by said door mirror case;

a lever including an intermediate pivot fulcrum portion pivotally supported in said door mirror case, one end portion formed as an operating portion which is manually pivotable in both vertical and horizontal directions thereof so as to rotate said mirror holder around an axis thereof, and an opposite end portion located in said door mirror case and formed as a connecting portion;

a first connecting member including an intermediate pivot fulcrum portion pivotally supported by a support axis in said door mirror case so as to rotate in both vertical and horizontal directions thereof, one end portion formed as a first connecting portion, and an opposite end portion formed as a second connecting portion, the support axis of the fulcrum portion being supported by said door mirror case to move in a direction perpendicularly intersecting an axial direction thereof; and a second connecting member including an axial portion arranged at a back surface of said mirror holder along a vertical axis of said mirror holder rotatably supported around an axis thereof, a protruding portion projecting from the axial portion in a backward direction of said mirror holder, and a first connecting portion formed at a specified portion of the protruding portion of said second connecting member along a horizontal axis of said mirror holder, either one of the connecting portion of said lever and the first connecting portion of said first connecting member having a spherical portion, and the other of the connecting portion of said lever and the first connecting portion of said first connecting member having a clasping portion rotatably holding the spherical portion therein, so that said lever is connected with said first connecting member by both the connecting portions to relatively bend in both vertical and horizontal directions thereof, preventing movement in an axial direction of one of said lever and said first connecting member, and preventing removal thereof, either one of the second connecting portion of said first connecting member and the first connecting portion of said second connecting member having a spherical portion, and the other of the second connecting portion of said first connecting member and the first connecting portion of said second connecting member having a clasping portion rotatably holding the spherical portion therein to rotate in both the vertical and horizontal directions with respect to said mirror holder, said lever being connected to said mirror holder through said first connecting member and said second connecting member, and said mirror holder being rotatable around both the vertical and horizontal axes thereof by operation of said lever so as to adjust the rotating angle of the mirror.

2. A mirror angle adjusting device for a door mirror assembly as claimed in claim 1, wherein said first connecting member comprises:

a first joint including the first connecting portion, of said first connecting member, formed at one end portion thereof, a second connecting portion formed at an opposite end portion thereof and an intermediate pivot fulcrum portion supported by said door mirror case through a support axis so as to rotate around both vertical and horizontal directions thereof, the support axis being supported by said door mirror case to move in a direction perpendicularly intersecting an axial direction thereof, and a second joint including a second connecting portion formed at one end portion thereof, the first connecting portion of said first connecting member being formed at an opposite end portion thereof, and an intermediate pivot fulcrum portion of said first connecting member, either one of the connecting portion of said lever and the first connecting portion of said first joint having a spherical portion, and the other of the connecting portion of said lever and the first connecting portion of said first joint having a clasping portion rotatably holding the spherical portion therein, so that said lever is connected with said first joint by both the connecting portions to relatively bend in both the vertical and horizontal directions thereof, while the preventing movement in the axial direction of one of said lever and said first joint, and preventing removal therefrom, either one of the second connecting portion of said first joint and the first connecting portion of said second joint having a spherical portion, and the other of the second connecting portion of said first joint and the first connecting portion of said second joint having a clasping portion rotatably holding the spherical portion therein, so that said first joint is connected with said second joint by both of the connecting portions to relatively bend in both the vertical and horizontal directions thereof, while preventing movement in an axial direction of one of said first joint and said second joint, and preventing removal therefrom.

* * * * *